March 17, 1953 — H. B. GILSON ET AL — 2,631,611
GAS CONTROL DEVICE
Filed May 22, 1948
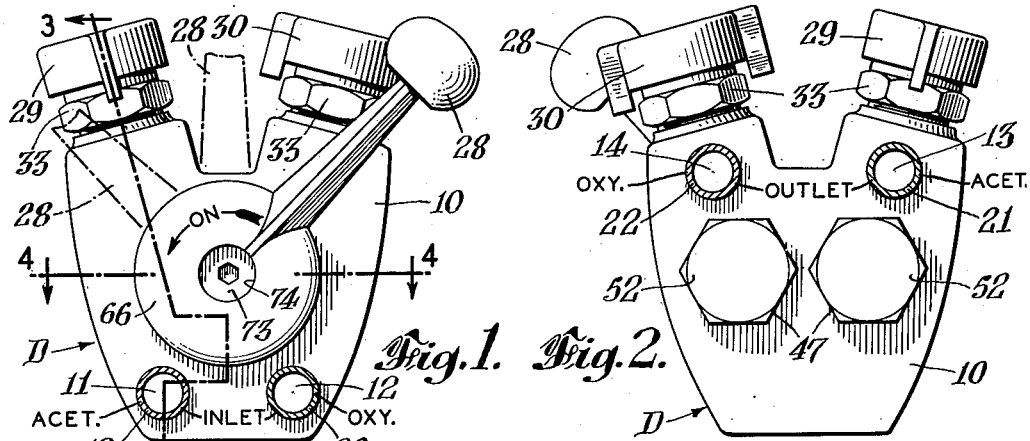
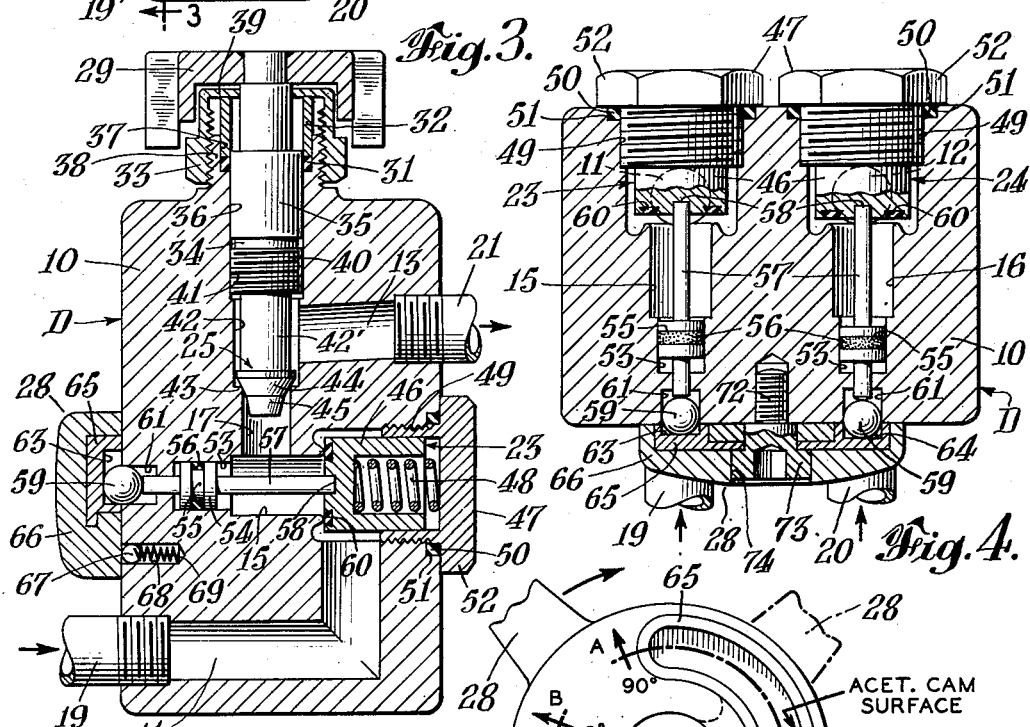
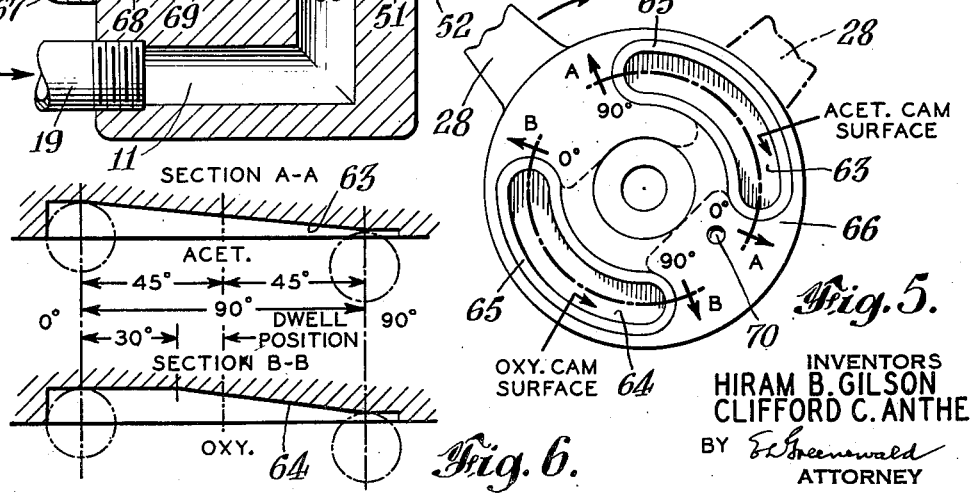
INVENTORS
HIRAM B. GILSON
CLIFFORD C. ANTHES
BY
ATTORNEY

Patented Mar. 17, 1953

2,631,611

UNITED STATES PATENT OFFICE

2,631,611

GAS CONTROL DEVICE

Hiram B. Gilson, Chatham, and Clifford C. Anthes, Union, N. J., assignors, by mesne assignments, to Union Carbide and Carbon Corporation, a corporation of New York Application May 22, 1948, Serial No. 28,554

3 Claims. (Cl. 137—630.2)

This invention relates to gas valves and more particularly to devices for controlling the flow of gases.

Young Patent 2,187,581 discloses a mechanism for opening and closing separate oxygen and acetylene gas supply valves in sequence. These valves are assembled in such a way that it is relatively difficult to service the valves and many parts are involved in the mechanism. Also, since effective gas throttling is not possible with such mechanism, it is necessary to use the gas valves of the blowpipe for this purpose, which is difficult owing to the occasional remoteness of the blowpipe with respect to the shut-off valve mechanism.

While the Young mechanism is satisfactory for controlling oxygen and acetylene when properly adjusted, a very pressing need still exists for greater reduction or possible elimination of backfire and flashback in oxy-acetylene gas supply equipment; as well as to reduce or avoid smoking and the resulting undesirable formation of soot in the equipment. Also, a need exists for more accurate control of the sequence in which the gases are turned on and off and for more uniform control of the maximum flow rate at which the separate gases are supplied. Furthermore, substantially wide gas flow and pressure ranges are required by present oxy-acetylene equipment, which prior gas control mechanisms are not capable of handling in an entirely satisfactory and safe manner.

Therefore, the main object of this invention is to provide in a unitary body a novel combination of throttle and shut-off valves in a gas control device which completely covers the wide flow and pressure ranges required by present oxyacetylene equipment, is compact, simple and economical in its parts, easy to assemble, repair, and keep in good operating condition, smooth yet positive in operation, has a long operating life, is relatively light in weight, and is constructed so as to effectively exclude dust and dirt from the internal moving parts. Another important object is to provide a gas control device which eliminates flashback and backfire in blowpipe equipment which is supplied with oxygen and fuel gas, especially acetylene. Another object is to provide a throttle valve having substantially uniform throttling characteristics. A further object is to provide an improved packing assembly for a gas throttle valve. Other objects will be clear to those skilled in the art from the following description of the invention.

According to the invention there is provided a novel combined dual shut-off and throttle valve gas control device in a compact construction comprising a body provided with suitable horizontal bores in one end of which separate shut-off valves are mounted for removal from the back of the body. A novel mechanism for operating the shut-off valves in sequence is also provided, which includes a handle mounted on the face of the body. Bores extend downwardly from the top of the body and contain separate throttle valves by means of which the maximum flow of the gases controlled by the respective shut-off valves can be conveniently adjusted.

In considering the burning of a mixture of oxygen and acetylene in a pipe, an ideal mixture of approximately one volume of oxygen is necessary for the equivalent amount of acetylene, that is, to be more specific, 2½ volumes of oxygen are required to burn one volume of acetylene completely. The gas mixture at one end of this pipe is ignited. The flame will travel along the length of the pipe at a certain speed. This speed is called the rate of flame propagation in feet per second. Now the amount of oxygen is reduced to something less than the ideal volume. The corresponding rate of flame propagation will be lower than for the ideal conditions. In other words, the rate of flame propagation (the speed of burning) is dependent on the oxygen concentration in the mixture. The gas control device of the invention contains novel means for automatically controlling the concentration of the gases in the oxy-acetylene mixture. If the flame is kept reducing at turn on, that is with the oxygen concentration lower than ideal as the gases are turned on for burning, there is less tendency for flashback to occur. If the flame is reducing at the start there is less tendency for a retrogression of burning gases back into the blow pipe and into the lead hoses to the device. The device is designed so that the acetylene is turned on first and the amount of oxygen is gradually increased to the ideal value.

Consider again the speed of burning. If the velocity with which the gas mixture is leaving the blowpipe is greater than the rate of burning back into the blowpipe, there will be no tendency to "pop" or to flashback. On the contrary, if the velocity with which the gases are leaving the equipment is less than the rate of flame propagation flashbacks will ocur. Operation of the device makes it easy for the operator to insure a slower burning reaction of the gases. The same importance is attached to turning off the flames. It will be recalled that it is usually desirable to turn the acetylene on first. On the other hand at the finish of the operation it is desirable to turn the acetylene off last. Generally, it is desirable to accomplish the turning on and the turning off of the gas in such a way that a reducing flame will be obtained. In summarizing, according to the invention, the acetylene valve is opened reasonably quickly and simultaneously enough oxygen is supplied so that a sooty flame will not result. Further, this will give a slow burning, a slow reaction, and give the raw gases coming into the blowpipe a chance to fill up the volume of hose and equipment and allow pressure of the gas to attain its maximum before the retrogression of burning gases into the equipment can result. Thus, "pops" or "flashbacks" will not occur.

In the drawing:

Fig. 1 is a view in front elevation of a dual shut-off and throttle valve device illustrating the invention;

Fig. 2 is a view in rear elevation of such device;

Fig. 3 is a sectional view taken on line 3—3 of Fig. 1;

Fig. 4 is a horizontal section on line 4—4 of Fig. 1;

Fig. 5 is a back view of the base of the handle showing the cam surfaces; and

Fig. 6 is a development view illustrating the operation of such cam surfaces.

The gas control device D comprises a body 10 composed of metal such as bronze having a pair of separate horizontal front gas inlets 11 and 12 which communicate with corresponding horizontal rear gas outlets 13 and 14 through horizontal shut-off gas bores or passages 15 and 16 and upwardly extending throttle-valve gas bores or passages, only one passage 17 of which is shown. The gas inlets 11 and 12 are connected by pipes 19 and 20 to suitable sources of gases, such as acetylene and oxygen under pressure, while the gas outlets 13 and 14 are connected by pipes 21 and 22 to the oxy-acetylene burning equipment (not shown). The horizontal gas passages 15 and 16 in the body 10 are provided with removable spring-closed gas shut-off valve assemblies 23 and 24, while the upwardly extending gas passages are provided with separate gas throttle valves, only one valve 25 of which is shown. The shut-off valves are sequentially controlled by a single handle 28. The throttle valves are individually controlled by separate finger-wheels 29 and 30.

Since the two throttle-valve packing assemblies are similar and interchangeable only one is described below in detail. Such assembly comprises a solid packing ring 31 composed of rubber, for example, a cylindrical packing follower 32 of metal, and a packing nut 33. The valve 25 has a stem 34 provided with a portion 35 which snugly mates with a portion 36 of the bore in line with the vertical gas passage 17. However, the stem portion 35 extends upwardly above the bottom of the upper portion 37 of such bore, thereby providing an annular recess for the packing ring 31 and a relatively short guide for the packing follower 32, the bore portion 37 being of greater diameter than that of the bore portion 36. The nut 33 is threaded to a nipple 38 on the body 10 and has an inturned end flange 39 which bears against the upper end of the packing follower 32. The flange also is adapted to engage the top of the portion 35 of the stem when the latter is fully unscrewed, so that the open position of the valve is thus indicated.

Thus, an improved packing assembly is provided which effectively seals the valve against gas leakage, permits smooth adjustment of the valve with ease, and which may be readily disassembled to replace the packing ring. To do this, it is only necessary to fully open the valve, unscrew the nut 33, remove the valve, the packing follower 32 and the old packing ring 31. A new packing ring is then inserted in the bore portion 37 and the parts are reassembled. The prior difficulty of replacing packing is thus overcome. Also, since the packing ring is solid, i. e. continuous, and is entirely confined within the valve body 10, the packing is prevented from extruding through the valve stem thread 40 which mates with a corresponding bore thread 41 located below the smooth bore portion 36.

The bore portion 42 in the zone of the gas outlet 13 is of constant diameter somewhat greater than that of the vertical gas passage 17 directly beneath the throttle valve, so that the bottom of the portion 42 provides an annular valve seat 43 for the valve 25, the corresponding portion 42' of the valve stem being of reduced diameter so that the gas flows upwardly, evenly around the stem and laterally out of the outlet 13 when the valve 25 is open. The needle valve 25 is double-tapered so as to provide improved and uniform gas flow characteristics when the valve is adjusted by turning the finger piece thereof. This is accomplished by contiguous double frusto-conical shapes 44 and 45 of 30° and 60°, respectively, in the needle valve 25, for cooperation with the annular valve seat 43. The maximum flow of gas is adjusted over a wide range by simply turning the finger wheel 29, the flow being substantially directly proportional to the degree of turning of the valve stem, by virtue of the novel dual-tapered shape of the valve 25.

The shut-off valve assemblies 23 and 24 are similar and the parts thereof are interchangeable. Each comprises a cup 46 slidably mounted in a cap 47 and urged toward closed position by a captive compression spring 48 which is disposed within the cup and presses against the bottoms of the cup and cap. The cap 47 is threaded in a socket 49 in the back of the body 10 in line with the horizontal bore 15. A solid packing ring 50 composed of rubber is seated in an annular recess 51 in the mouth of the socket 49 and engages the flange 52 of the cap 47, effectively sealing the parts against gas leakage.

At the opposite end of the horizontal passage 15 and in line with it is another socket 53 providing a cylinder in which is mounted a piston 54 having an annular groove 55 in which is mounted a solid packing ring 56 composed of rubber, for example. The piston constitutes the medial part of a stainless steel push-rod 57; one end of which fits a socket 58 in the face of the valve 23, and the other end of which bears against a stainless steel ball 59. Thus, when the rod 57 is pushed inwardly the valve 23 is unseated and opened. To prevent any gas leakage when the shut-off valve is closed a solid packing ring 60 composed of molded rubber is secured in an annular groove provided therefor in the face of the valve cup 46.

The balls 59 are located in sockets 61 in the front body 10 in line with the sockets 53 but facing oppositely thereto. Portions of the balls extend out of the sockets 61 and bear against cam surfaces 63 and 64 in the bottom of arcuate grooves in a bearing member 65 located in a suitably shaped recess in the base 66 of the handle 28. The handle may be composed of bronze and the bearing member of a hard metal alloy.

A ball detent 67 is mounted in a socket 68 in the body 10 and is urged outwardly by a compression spring 69 into engagement with the handle base 66 for the purpose of temporarily locking the handle at a critical point providing a time-delay at such point, by engaging a pocket 70 located in the inner surface of the handle base. The handle base 66 is rotatably connected to the body 10 by a screw 72 the head 73 of which is countersunk in a socket 74 in the center of such base. The inner face of the handle base snugly fits the face of the body 10 so that dust and dirt are effectively excluded from the interior of the device. The axis of movement of the handle is located between and parallel to the axes of the shut-off valve bores in the body.

In operation the gases being controlled, such as oxygene and acetylene, enter the gas inlets 11 and 12 by way of the gas supply pipes 19 and 20. Such gases then flow to the shut-off valves 23 and 24. When the handle 28 is moved in a clockwise direction, as indicated in Fig. 5, the balls 59, which are located between the cam surfaces and the ends of the rods 57, are depressed and advance the rods and the cups 46 against the force of the springs 48. This moves the valves 23 and 24 to open-position in a predetermined sequence.

In such movement of the handle 28 the ball detent 67 furnishes a frictional drag so that a handle will remain in any desired released position. As can be seen from an inspection of Figs. 5 and 6, the acetylene valve opening precedes the oxygen valve opening starting at 0° and increasing uniformly to 90°. When the detent 67 engages the pocket 70, the movement of the handle is temporarily halted causing a dwell in a critical position of the opening sequence of the valves in which the acetylene valve is about half-open and the oxygen valve is just "cracked" open. This introduces a time-delay in the initial supply of gases which insures safe operation and prevents flashback, backfire and smoky starting of the oxy-acetylene flame. One of the basic reasons for the unique and particular cam and temporary stop arrangement in the present device is to reduce backfires and therefore flashback tendency, when the device is used with oxy-acetylene burning equipment. The detent 67 engages the pocket or recess 70 to locate the specific position for the operator to hesitate, an action which contributes to flashback elimination by reducing the oxygen concentration in the mixture.

The present device insures a positive sequence and time delay at a critical point in the operation of the shut-off valves, so that the acetylene is always turned on first and shut off last with respect to the oxygen. The cam arrangement introduces sufficient acetylene at the "immediate turn-on" to prevent any back-up of oxygen gas into the acetylene line at "turn-off." The oxygen being turned off first allows an increased acetylene concentration to again reduce any backfire or flashback tendency.

The shut-off valves of the present invention show no perceptible wear even after hundreds of thousands of operations. Another advantage is that uniform throttling and quick shut-off are incorporated in one device. The new valves also cover the wide flow and pressure requirements of existing oxy-acetylene equipment, as well as possible future equipment.

Since the new throttle valve is inexpensive to manufacture and produces good throttling characteristics over wide flow ranges, it is suitable for use in other devices and for handling gases other than oxygen and acetylene. The parts of the throttle valves are identical and interchangeable, as are the parts of the shut-off valves and associated apparatus. Furthermore, the removable parts are located so that they can be individually serviced without removal of the other parts.

Advantages of the present invention over the device disclosed in the patent to Young, for example, include a considerable reduction in the required number of mechanical parts, simplification of the assembly, reduction in the weight, increased operating life, smoother operation, and better performance with regard to flashback and backfire tendency, as well as full adjustment over a wide range of gas pressures and flows.

The illustrated device combines oxygen and acetylene throttling valves for blowpipe flame adjustment as well as quick shut-off valves. The present most useful application of the invention is in combination with so-called machine oxyacetylene blowpipes which contain no throttle valves. Such blowpipes have good flashback resistance, but any residual tendency toward flashback is further reduced by the cam arrangement of the shut-off part of the invention which is designed to turn on the acetylene before the oxygen is turned on, and to shut off the acetylene after the oxygen flow has been stopped. It is also possible to use the subject device with blowpipes having throttle valves of their own, i. e., as a quick shut-off valve only, simply by adjusting the throttle valves of the device to the fully open position.

So-called O rings composed of a blend of natural and synthetic rubber are utilized to effect the movable gas seals between the shut-off valves and the atmosphere. Such an arrangement requires no additional stationary packing, no take-up, and no adjustment, such as that necessary with prior packings. The throttle valves are similarly equipped with O rings of rubber, and this greatly simplifies assembly and repair, as pointed out above.

The invention makes safer the prior always dangerous handling of oxygen and fuel gases, especially acetylene, by overcoming the danger of flashback. The industry is vitally concerned with the safer use of such gases. Flashback, with the attendant burning of equipment, and nuisance in general, is virtually eliminated by the present invention which controls the supply of gases in such a way that the problem is solved. The present device solves the problem of flashback.

It will be understood by those skilled in the art that instead of handling two different gases, one gas, or more than two, may be handled by simply reducing or increasing the number of valves to suit the number of different gases to be handled by the device. Also, either the shut-off valve improvements or the throttle valve improvements may be employed without the other.

We claim:

1. An oxy-fuel gas control device comprising a body having a pair of through-bores one for fuel gas and the other for oxygen, each of said bores containing a gas shut-off valve in one end thereof, a handle having a base covering the other end of both of such through-bores, such handle base being pivoted to the body for arcuate movement about an eccentric axis extending parallel to such bores, means connecting said base and said shut-off valves for sequential operation when the handle is moved about its axis, such sequential operation having a critical point in which the fuel gas valve is about half open and the oxygen valve is just cracked open, and means acting to temporarily restrain the operation of the valves at such critical point so as to insure a momentary time delay at such point in the sequential operation of the gas shut-off valves for the purpose of momentarily holding such valves in such positions, whereby subsequent mixing of the oxygen and fuel gas flowing through said valves is accomplished at such a velocity and concentration that flashbacks and backfires are absolutely prevented.

2. A gas control device comprising a body having separate horizontal bores extending from the back to the front of the body, separate bores extending downwardly from the top of the body to the horizontal bores, gas inlet and outlet passages in communication with such bores, shut-off valves associated with the horizontal bores at the back of the body, a handle having a base pivotally mounted on the front face of the body and bearing on such face and covering the horizontal bores, means acting to operate said shut-off valves in sequence when the handle is moved through an arc whereby such valves have different rates of opening and closing providing a critical point in the operation of such valves in which the flows of the gases are in a predetermined ratio for a predetermined time interval, and temporary dwell means acting to restrict the rate of movement of said handle and the resulting operation of the shut-off valves so as to insure such time interval in the sequential operation of said shut-off valves.

3. A multiple shut-off valve gas control device comprising a body having separate shut-off valve bores extending from the back to the front of the body, each shut-off valve bore having a shut-off valve seat facing toward the back of the body, a spring-closed shut-off valve assembly mounted in each shut-off valve bore and removable from the back of the body, a shut-off valve push-rod mounted to reciprocate in each push-rod bore, a shut-off valve operating handle having a base mounted to bear on the face of said body for angular movement about an axis parallel to that of the shut-off valve bores, arcuate cams having different slopes on the inner side of said handle base, and bearings located between said cams and push-rods for opening and closing the shut-off valves in sequence by virtue of such different slopes of said cams when the handle is moved in one direction or the other, said different cam slopes providing a critical position of the handle base in which one valve is about half open and the other is just cracked open, and spring pressed detent and recess means between said handle base and body acting to temporarily lock the handle in such critical position in the course of its movement in either direction to delay the operation of the shut-off valves and to indicate such position to the operator.

HIRAM B. GILSON.
CLIFFORD C. ANTHES.

REFERENCES CITED

The following references are of record in the file of this patent:

UNITED STATES PATENTS

| Number | Name | Date |
|---|---|---|
| 70,815 | Crowley | Nov. 12, 1867 |
| 985,166 | Hall | Feb. 28, 1911 |
| 1,099,389 | Morrison | June 9, 1914 |
| 1,177,897 | Richardson | Apr. 4, 1916 |
| 1,370,875 | Butler | Mar. 8, 1921 |
| 1,436,650 | Gilbert | Nov. 28, 1922 |
| 1,462,857 | Hiller | July 24, 1923 |
| 1,619,276 | Travis | Mar. 1, 1927 |
| 1,639,450 | Bastian | Aug. 16, 1927 |
| 1,721,569 | McCutcheon | July 23, 1929 |
| 1,743,738 | Travis | Jan. 14, 1930 |
| 1,763,687 | Chadwick | June 17, 1930 |
| 1,822,117 | Travis | Sept. 8, 1931 |
| 2,028,032 | White | Jan. 14, 1936 |
| 2,095,789 | Buchkam | Oct. 12, 1937 |
| 2,187,581 | Young | Jan. 16, 1940 |
| 2,510,393 | Fraser | June 6, 1950 |